United States Patent
Schmidt et al.

(10) Patent No.: US 10,501,378 B2
(45) Date of Patent: Dec. 10, 2019

(54) CONFORMAL COMPOSITE COATINGS AND METHODS

(71) Applicant: United Technologies Corporation, Hartford, CT (US)

(72) Inventors: Wayde R. Schmidt, Pomfret Center, CT (US); Sonia Tulyani, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 583 days.

(21) Appl. No.: 14/629,829

(22) Filed: Feb. 24, 2015

(65) Prior Publication Data
US 2016/0244372 A1 Aug. 25, 2016

(51) Int. Cl.
C04B 35/628 (2006.01)
B05D 1/36 (2006.01)
B05D 1/00 (2006.01)

(52) U.S. Cl.
CPC ........ *C04B 35/62863* (2013.01); *B05D 1/007* (2013.01); *B05D 1/36* (2013.01); *C04B 35/62868* (2013.01)

(58) Field of Classification Search
CPC ........ C04B 35/62863; C04B 35/62886; C04B 35/62894; C04B 35/571; C04B 35/583; C04B 35/62868; C04B 35/80; C04B 35/806; C04B 35/62897; C04B 2235/3826; C04B 2235/428; C04B 2235/5244; C04B 41/87; C04B 41/5027; C04B 41/52; C04B 41/5059; C04B 41/5066; C04B 41/5096; C04B 41/89; C04B 41/522; C04B 37/005; C04B 35/62871; C04B 35/62873; C04B 35/628; C04B 35/10; C04B 35/565; C04B 35/584; C04B 35/803; B32B 18/00;
(Continued)

(56) References Cited

U.S. PATENT DOCUMENTS 5,476,684 A * 12/1995 Smith .................. C04B 35/806
427/228
2002/0076541 A1* 6/2002 Jarmon ................ C04B 35/806
428/312.6
(Continued)

FOREIGN PATENT DOCUMENTS

EP 2189504 A1 5/2010
EP 2962844 A2 1/2016
WO WO2014150393 * 9/2014

OTHER PUBLICATIONS

Partial European Search Report, for European Patent Application No. 16156987.6, dated Jul. 12, 2016, 8 pages.
Ionescu, Emmanuel, Mera, Gabriela, and Riedel, Ralf, "Polymer-derived ceramics (PDCs): Materials design towards applications at ultrahigh-temperatures and in extreme environments." Book chapter 7 in "MAX phases and ultra-high temperature ceramics for extreme environments" (Low, I.M. et al. eds., 2013): 203-245.†
Kabacoff, Lawrence T., "Nanoceramic coatings exhibit much higher toughness and wear resistance than conventional coatings." AMPTIAC Quarterly 6.1 (2002): 37-42.†
(Continued)

*Primary Examiner* — Camie S Thompson
(74) *Attorney, Agent, or Firm* — Kinney & Lange, P.A.

(57) ABSTRACT

An embodiment of an article includes a substrate and a conformal coating. The conformal coating includes a first particulate layer between a first matrix layer and a second matrix layer. The first particulate layer includes a first plurality of ordered inorganic particles spaced and distributed substantially uniformly throughout the first particulate layer, and a ceramic matrix material disposed between individual ones of the first plurality of particles.

19 Claims, 3 Drawing Sheets

(58) Field of Classification Search
CPC ... D05D 1/00; B05D 1/00; B05D 1/36; B05D 1/007; C08K 3/14; C08K 3/28; C09D 7/70; F05D 2300/2261; F05D 2300/603; F05D 2300/6033; Y10T 428/24993; Y10S 427/10
USPC .......... 427/212–222, 249.15, 249.1, 255.38, 427/255.7, 419.7, 419.2, 255.394, 402; 428/221–365, 446, 450, 294.1; 106/286.1, 249.1, 255.7, 419.7, 419.2, 106/380, 255.38, 255.394
See application file for complete search history.

(56) References Cited

U.S. PATENT DOCUMENTS

| | | |
|---|---|---|
| 2010/0015396 A1 | 1/2010 | Johnson et al. |
| 2012/0164430 A1* | 6/2012 | Thebault ............. C04B 35/6286 428/293.4 |
| 2016/0159702 A1* | 6/2016 | Lazur ................ C04B 35/62863 427/249.15 |

OTHER PUBLICATIONS

Corral, Erica L., "Ultra-high temperature ceramic coatings." Advanced Materials & Processes, Oct. 2008: 30-32.†

* cited by examiner
† cited by third party

CONFORMAL COMPOSITE COATINGS AND METHODS

BACKGROUND

The disclosure relates generally to coatings and more specifically to ceramic layer-by-layer coatings.

Conventional processing of ceramics can be difficult, particularly when seeking to conformally coat fibers. Layer-by-layer fabrication of ceramic coatings has been shown to produce structures with desired features such as enhanced durability and toughness. However, the water-soluble polymers and clays used in current processes remain relatively slow and difficult to manage, while the resulting coatings are not uniform and not appropriate for certain hostile application environments.

Since certain polymers cannot infiltrate between the individual clay particles, the clay, absent some other inducement, will form large and amorphous clumps which are locally weakened at the interfaces between certain polymers and the clay particles. In addition, processes and raw materials of this type do not readily self-assemble into an ordered structure about the substrate.

SUMMARY

An embodiment of an article includes a substrate and a conformal coating. The conformal coating includes a first particulate layer between a first matrix layer and a second matrix layer. The first particulate layer includes a first plurality of ordered inorganic particles spaced and distributed substantially uniformly throughout the first particulate layer, and a ceramic matrix material disposed between individual ones of the first plurality of particles.

An embodiment of a composite article includes a first plurality of fibers distributed throughout a binder or bulk matrix. The first plurality of fibers includes a substrate, and a coating which includes a plurality of particulate layers and a plurality of matrix layers. Each particulate layer has a plurality of ordered inorganic particles spaced and distributed substantially uniformly throughout each layer, and a ceramic matrix material disposed between individual ones of the plurality of particles. The plurality of matrix layers includes primarily the ceramic matrix material disposed between individual ones of the plurality of particulate layers.

An embodiment of a method includes applying a preceramic composition and a plurality of inorganic particles to a receiving surface. The combination of the preceramic composition and the inorganic particles is cured to form at least a particulate layer and a matrix layer on the receiving surface.

DETAILED DESCRIPTION

Figure 1:
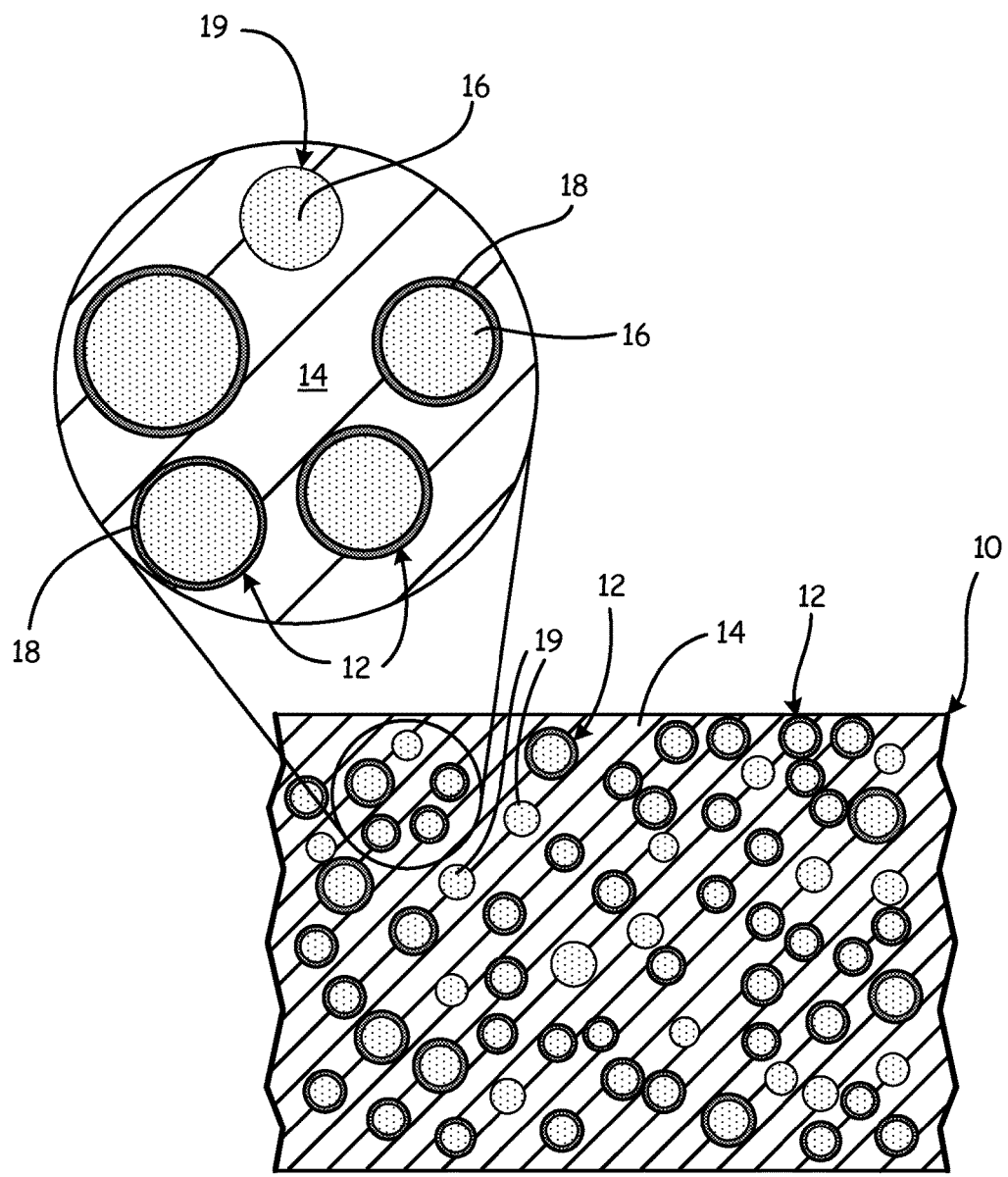
FIG. 1 shows a cross-section of a composite material formed with coated and uncoated fibers.

FIG. 1 shows composite material 10 which includes a first plurality of coated fibers 12 and binder or bulk matrix material 14. In a number of industries, fibers can be combined with a binder/bulk matrix material to form a composite (e.g., ceramic matrix composites, glass matrix composites, metal matrix composites, and polymer matrix composites). Some non-limiting examples of composites include airfoils and cases for gas turbine engines. In composite material 10, at least some of coated fibers 12 can include substrate 16 with conformal coating 18, shown in more detail in subsequent figures. In certain embodiments, coated fibers 12 can be intermingled with a second plurality of fibers 19, which do not have a conformal coating, and can have the same or different composition(s) as coated fiber substrate(s) 16.

Figure 2:
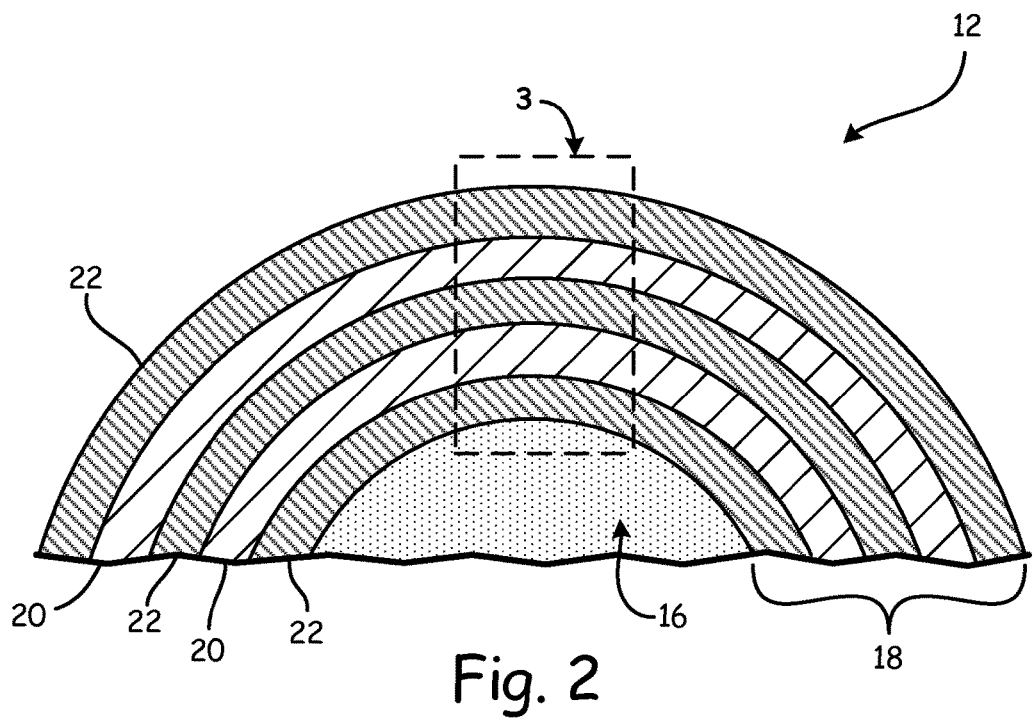
FIG. 2 shows a coated fiber from the composite material of FIG. 1.

FIG. 2 shows an example coated fiber 12 with substrate 16 and conformal coating 18. Substrate 16 of fibers 12 can be selected from one or more of a group consisting of: oxide ceramic fibers, carbide ceramic fibers, nitride ceramic fibers, boride ceramic fibers, phosphide ceramic fibers, glass-ceramic fibers, oxycarbide fibers, oxynitride fibers, metal fibers, glass fibers, and carbon fibers. Such fibers are used in a wide variety of manufacturing processes. Various fibers are grouped, typically wound, woven, wrapped or handled in other ways to make fabrics, preforms, etc. These groups of fibers 12 can be used independently, or can be formed into a composite material (e.g., composite material 10 shown in FIG. 1). In one non-limiting example, the fibers include silicon carbide (SiC) fibers Conformal coating 18 can be a composite coating which includes a plurality of particulate layers 20 alternating with a plurality of matrix layers 22 on an outer surface of substrate 16. Each particulate layer 20 includes a plurality of spaced and distributed inorganic filler particles (shown in FIG. 3). A ceramic matrix material, which can be the same material as in matrix layers 22, is disposed between individual ones of the particles as shown below. In one such example, this can include ceramic matrix material 22 and particulate layers 20 disposed on the outer surface of substrate 16, which itself can be an individual fiber substrate or individually reinforced fiber.

Figure 3:
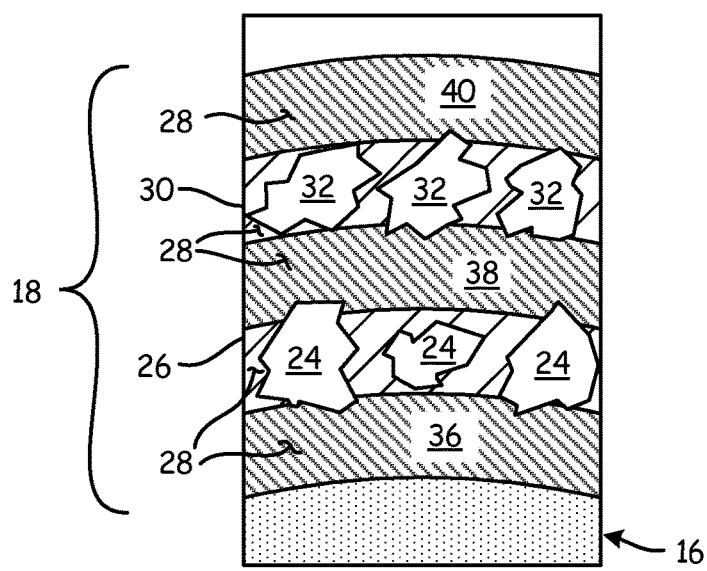
FIG. 3 is a detailed view of the coating shown in FIG. 2.

FIG. 3 shows a detailed view of conformal coating 18, and includes a first plurality of inorganic filler particles 24 spaced and distributed throughout first particulate layer 26. Ceramic matrix material 28 can be disposed between individual ones of the first plurality of filler particles 24. Second inorganic particulate layer 30 can include a second plurality of inorganic filler particles 32 spaced and distributed therethrough. Ceramic matrix material 28 can also be disposed between individual ones of the second plurality of filler particles 32. The matrix of individual layers (e.g., matrix material 28) and the matrix of the overall composite article (e.g., binder/bulk matrix material 14 shown in FIG. 1) need not be the same composition. Multiple sets of alternating layers can define conformal coating 18 with a "brick-and-mortar" type structure. On a finer scale within individual layers 20, 30, the particulate and matrix can similarly be arranged in a "brick-and-mortar" type structure.

First matrix layer 36 is disposed adjacent to or between first particulate layer 26 and second particulate layer 30. Second matrix layer 38 can also be disposed between two particulate layers, and here is shown adjacent to second particulate layer 30. Second particulate layer 30 can be disposed between second and third matrix layers 38, 40. Matrix layers 36, 38, 40 include primarily ceramic matrix material 28. In certain embodiments, less than 10% of the particles 24 in first particulate layer 26 protrude into second particulate layer 30, and vice versa.

Conventional fibers are sometimes coated to improve certain properties of the composite, or of the fibers alone when not combined with a binder or bulk matrix into a composite material. Conventional coatings, and even certain multilayer coatings have been applied via vapor deposition, dip or spray coating. However, with such conventional processes, uniformity and adherence of the fiber coating can be an issue, and providing multiphase compositions is difficult and expensive. For example, in fibers conventionally coated with particulates, the particulates can clump together in certain locations along the fiber, reducing final coating effectiveness, leading to uneven reinforcement or other shortcomings. Even current multilayer deposition processes for non-particulates rely on a conventional dip-type process alternating between two or more coating solutions, each solution corresponding to the different coating layer. In many cases, individually deposited layers of the multilayer coating must be processed independently, often using different processing conditions. This is a time- and labor-intensive process which makes multilayer coatings less practical for many uses.

In contrast, conformal coating 18 can be applied to substrate 16 via a layer-by-layer (LBL) deposition process to form coated fibers 12. A preceramic polymer compound can be used in combination with filler particulates as part of a single coating solution. This effectively cuts the number of process steps in half while improving coating quality and ensuring uniformity over previous processes with substantially uniform and ordered particle distribution. In an alternative approach, a preceramic polymer compound can be part of a first solution and a dispersion of filler particulate can be another liquid which, when used in conjunction with the first solution, can provide a conformal coating on substrate 16.

Figure 4:
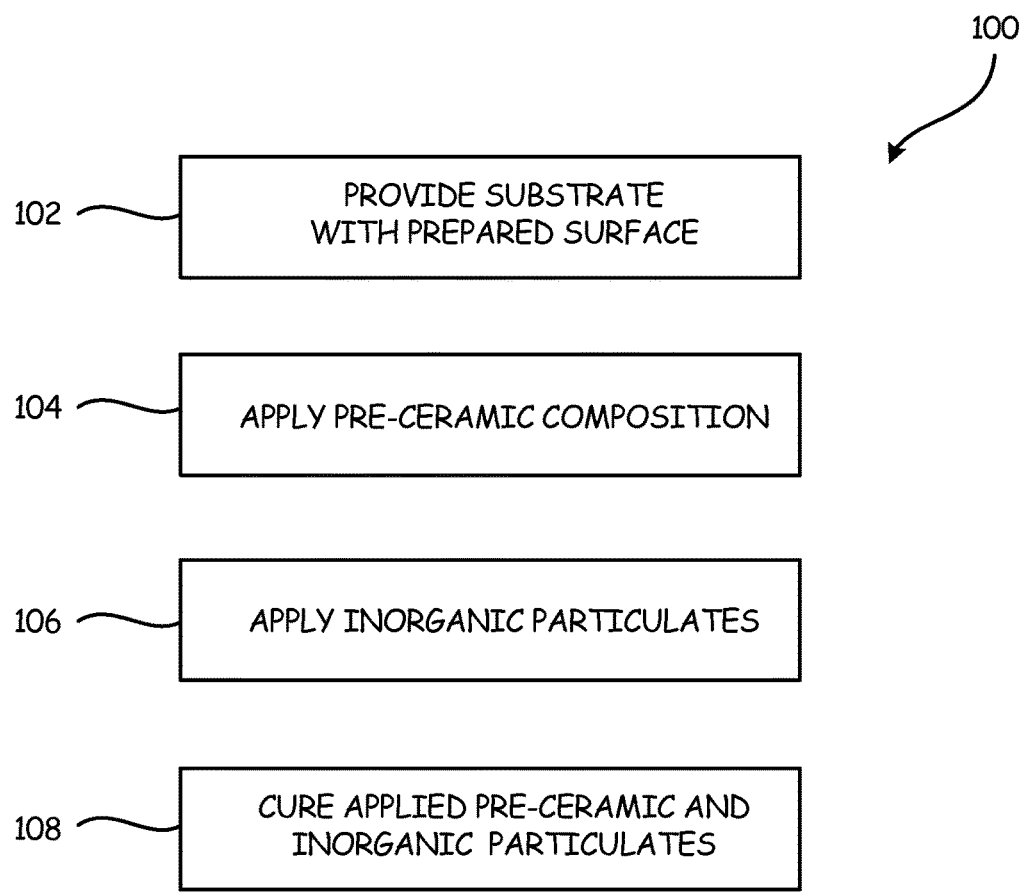
FIG. 4 is a process chart detailing steps to make a coating.

FIG. 4 shows coating method 100 for forming an LBL coating. Method 100 first includes step 102 of providing a substrate with at least one surface prepared to receive a coating. As will be explained in more detail, the ceramic precursors in solution and the dispersed particulates can have opposing electrical charges. Thus the substrate surface(s) must be prepared to interact with those as well. This can depend on a particular coating but step 102 can include one or more chemical, physical, electrical, mechanical or other processes known in the art to induce positive- or negative-charged coating receiving surface(s).

Next, step 104 includes applying a preceramic composition to the substrate, while step 106 includes applying a plurality of inorganic filler particles to the substrate. Steps 104 and 106 can be performed simultaneously or in an alternating manner with step 108 below. Performing the steps together, however, using a single coating solution can greatly expedite the process by eliminating a number of repetitive steps. The coating system is designed to "self assemble" on the substrate to produce an energetically favorable state, i.e., one having a relatively low system energy.

To facilitate a conformal coating in which the "brick-and-mortar" distribution is ordered and substantially uniform, e.g., where less than 10% of the filler particulates in one particulate layer protrude into a nearby particulate layer, the preceramic composition can at least partially dissociate in a first solution. This can include, for example, an ionizable preceramic compound that is soluble in an appropriate liquid. Examples include halo- and hydroxyl-substituted polycarbosilanes or polysiloxanes. Appropriate liquids include aqueous-based liquids, non-aqueous liquids, solvent blends, organic liquids and ionic liquids. In other examples, a preceramic composition includes a polymer having a plurality of side or functional groups, at least some of which are adapted to readily dissociate from the polymer.

Examples of organic preceramic polymer types can include polycarbosilane, polysiloxane, polysilazane, polycarbosiloxane, polysilane and polycarbosilazane, all of which can further convert with heat into silicon-based ceramic precursors, so that the resulting ceramic matrix material includes a silicon-based matrix (e.g., silicon carbide (SiC), silicon oxycarbide (SiOC), silicon nitride ($Si_3N_4$), silicon dioxide ($SiO_2$), silicon carbonitride (SiCN)). Generally, the solution can include any preceramic composition adapted to dissociate under controlled conditions where thermally and/or chemically induced dissociation results in a partially charged preceramic composition with one or more types of ceramic precursors. Other organic, inorganic, and ionic preceramic compounds can be used to form ceramic matrix compositions other than silicon carbide (SiC). An appropriate composition of the first solution is based on compatibility with the preceramic composition, and ability to facilitate dissociation of particular ionic or functional groups from the preceramic composition. Example solutions include aqueous acid solutions, aqueous basic solutions, polar organic solvents and ionic liquids.

One suitable example polymer class includes preceramic siloxanes, $HO[-SiR^1R^2O-]_nH$, where $R^1$, $R^2$ are functional groups and/or other polysiloxane chains attached to the silicon atom, with at least one of $R^1$, $R^2$ partially dissociable. Another suitable example polymer class includes polycarbosilanes ($-CH_2-Si-)_n(XY)_m$), where X and Y are functional groups and/or other polycarbosilane chains attached to the silicon atom. At least one of X and Y is partially dissociable to create a charged species on the polymer chain. In one example, X and Y have substantially different electronegativities and/or a relatively large dissociation constant K. When placed in solution, heated, and/or chemically induced, the functional groups X and/or Y on the polymer chain at least partially dissociate leaving behind negatively charged ceramic precursors.

With respect to step 106, the inorganic filler material can include one or more filler compositions. In certain examples, the particles can be selected from glass, carbides, oxides, nitrides, borides, phosphides, sulfides, and combinations thereof. Particle morphologies can be selected to be planar, spherical, fibrous, nanostructured, acicular and/or elongated as desired by the selected application and the preceramic polymer choice. In one non-limiting example, at least one of the pluralities of particles includes boron nitride (BN). Prior to placing them in a suitable liquid for dispersion or dissolution, the filler material can be provided with a charge opposite that of the expected charge of the preceramic composition from step 104. An appropriate composition of the second solution is based on compatibility with the filler material, and ability to facilitate dispersion of the filler material.

In the example of negatively charged ceramic precursors, the BN or other particles can be positively charged via suitable well-known processes. Though described with respect to a single particle composition, it will be recognized that multiple types of particulates can be used. That is, each particulate layer may have more than one particle composition, and/or different particulate layers can have a single composition which differs from layer to layer. Attractive forces between oppositely charged preceramic polymer layers and inorganic filler-based dispersions to create self-assembled structures can be passive, in that they are caused by naturally formed dissociated chemical structures or they can be active, in which charge differences are induced with an applied electromotive field using electrophoretic or electrostatic methods.

In certain embodiments, the ceramic precursor and the filler material are placed in a common liquid or solution, allowing steps 104 and 106 to be performed simultaneously. Once the prepared substrate surface is placed in the liquid or solution(s) referenced in steps 104 and 106, step 108 is performed to cure the first layers of the coating. Depending on the particular compositions selected, and the available time and resources, various curing processes can be implemented with examples including application of thermal and/or electromagnetic energy or exposure to certain atmospheric compositions and/or pressures.

In step 108, the combination of the preceramic composition and the filler particles are cured about the substrate to form a ceramic filler layer and a matrix layer. Generally speaking steps 104-108 can be iteratively performed to form a composite layer-by-layer (LBL) coating on a substrate (e.g., a fiber) to result in an LBL coating which includes a plurality of particle layers.

In certain instances, particularly where thermal curing is involved, during ramp up to curing step 108 or during the curing step itself, the functional groups on many of the molecules can begin dissociating on or from the polymer chain. Partial dissociation may also occur by hydrolysis reactions of hydrolysable functional groups on polymers caused by the presence of small amounts of water in solutions of the polymers in organic solvents.

The resulting coating can have a plurality of matrix layers alternating with individual ones of the plurality of filler layers. Each filler layer can include a plurality of ceramic filler particles spaced and distributed throughout the filler layer, with a ceramic matrix material disposed between individual ones of the plurality of particles. Each matrix layer can include primarily the ceramic matrix material.

Example

In one example, substituted polycarbosilane has hydroxy or alkoxy functional groups which at least partially dissociate in the presence of water above about 0° C. (about 32° F.). A hydroxide (OH—) or alkoxide (RO—) is the ionic or salt form, derived from the hydroxyl or alkoxy functional group when the proton is replaced by a metal.

A substrate, such as a SiC fiber, with at least one prepared surface is placed in the solution. In one example, the prepared surface has a slightly positive charge which will attract the electronegative or negatively charged substituted polycarbosilane preceramic polymer with partially dissociated alkoxy groups. Thus, the prepared surface is coated with a layer of preceramic polymer in 104. In a subsequent step 106, positively charged filler particles are provided and are electrostatically attracted to the negatively charged SiC precursors.

The prepared surface can have a positive/negative charge so as to attract the charged particulates/ceramic precursors. To further facilitate separation of the particles (BN or otherwise), they can be positively charged so that they are repelled from one another but attracted to the negative ceramic precursor polymer chains, subchains or functional groups.

These filler particles end up alternating and stacking in a self assembly manner to form at least a matrix layer and a particulate layer. An optional curing step 108 increases the stability of the deposited layer(s). Curing step 108 can include any single or multiple application of a method suitable for increasing the molecular weight of the preceramic polymer (thermal, UV, IR, visible, microwave, ultrasonic or other suitable electromagnetic radiation, or differential solubility). In practice, the cured preceramic polymer/filler layers would be further processed by applying additional energy (thermal, microwave, etc.) to the composite coatings in one or more steps to convert the preceramic polymer into the desired inorganic ceramic phase(s) such as SiC. In combination with the plurality of particles such as boron nitride (BN), as part of curing and further processing, these preceramic polymer would produce an amorphous structure including mostly silicon carbide (SiC) to form the matrix about the BN filler particles. Repeating the process results in a conformal coated reinforced fiber with a self-ordered "brick-and-mortar" composition.

Discussion of Possible Embodiments

The following are non-exclusive descriptions of possible embodiments of the present disclosure.

An embodiment of an article includes a substrate and a conformal coating. The conformal coating includes a first particulate layer between a first matrix layer and a second matrix layer. The first particulate layer includes a first plurality of ordered inorganic particles spaced and distributed substantially uniformly throughout the first particulate layer, and a ceramic matrix material disposed between individual ones of the first plurality of particles.

The article of the preceding paragraph can optionally include, additionally and/or alternatively, any one or more of the following features, configurations and/or additional components:

An article according to an exemplary embodiment of this disclosure, among other possible things includes a substrate; and a conformal coating comprising: a first matrix layer including primarily a ceramic matrix material; a second matrix layer including primarily the ceramic matrix material; and a first particulate layer disposed between the first and second matrix layers, the first particulate layer including a plurality of ordered inorganic particles spaced and distributed substantially uniformly throughout the first particulate layer, and the ceramic matrix material disposed between individual ones of the first plurality of particles.

A further embodiment of the foregoing article, wherein the substrate comprises a fiber formed from one of a group consisting of: oxide ceramic fibers, carbide ceramic fibers, nitride ceramic fibers, boride ceramic fibers, phosphide ceramic fibers, glass-ceramic fibers, oxycarbide fibers, oxynitride fibers, metal fibers, glass fibers, and carbon fibers.

A further embodiment of any of the foregoing articles, wherein the fiber comprises silicon carbide (SiC).

A further embodiment of any of the foregoing articles, wherein the first plurality of inorganic particles comprises boron nitride (BN) particles.

A further embodiment of any of the foregoing articles, wherein the ceramic matrix material comprises silicon carbide (SiC).

A further embodiment of any of the foregoing articles, wherein the article further comprises: a second particulate layer disposed adjacent to one of the first and second matrix layers, the second particulate layer including a second plurality of ordered inorganic particles spaced and distributed substantially uniformly throughout the second particulate layer, and the ceramic matrix material disposed between individual ones of the second plurality of particles; wherein less than 10% of the particles in the first particulate layer protrude into the second particulate layer.

An embodiment of a composite article includes a first plurality of fibers distributed throughout a binder or bulk matrix. The first plurality of fibers includes a substrate, and a coating which includes a plurality of particulate layers and a plurality of matrix layers. Each particulate layer has a plurality of ordered inorganic particles spaced and distributed substantially uniformly throughout each layer, and a ceramic matrix material disposed between individual ones of the plurality of particles. The plurality of matrix layers includes primarily the ceramic matrix material disposed between individual ones of the plurality of particulate layers.

The composite article of the preceding paragraph can optionally include, additionally and/or alternatively, any one or more of the following features, configurations and/or additional components:

A composite article according to an exemplary embodiment of this disclosure, among other possible things includes a binder; and a first plurality of fibers distributed throughout the binder, the first plurality of fibers comprising: a substrate; and a coating comprising: a plurality of particulate layers, each layer including a plurality of ordered inorganic particles spaced and distributed substantially uniformly throughout each layer, and a ceramic matrix material disposed between individual ones of the plurality of particles; and a plurality of matrix layers including primarily the ceramic matrix material disposed between individual ones of the plurality of particulate layers.

A further embodiment of the foregoing composite article, wherein the substrate is selected from one or more of a group consisting of: oxide ceramic fibers, carbide ceramic fibers, nitride ceramic fibers, boride ceramic fibers, phosphide ceramic fibers, glass-ceramic fibers, oxycarbide fibers, oxynitride fibers, metal fibers, glass fibers, and carbon fibers.

A further embodiment of any of the foregoing composite articles, wherein the substrate comprises silicon carbide (SiC).

A further embodiment of any of the foregoing composite articles, wherein the plurality of ceramic particles comprises boron nitride (BN) and the ceramic matrix material comprises silicon carbide (SiC).

A further embodiment of any of the foregoing composite articles, wherein the composite article further comprises: a second plurality of fibers intermingled with the first plurality of fibers, wherein the second plurality of fibers do not include the conformal coating.

An embodiment of a method includes applying a preceramic composition and a plurality of inorganic particles to a receiving surface. The combination of the preceramic composition and the inorganic particles are cured to form at least a particulate layer and a matrix layer on the receiving surface.

The method of the preceding paragraph can optionally include, additionally and/or alternatively, any one or more of the following features, configurations and/or additional components:

A method according to an exemplary embodiment of this disclosure, among other possible things includes (a) applying a preceramic composition to a receiving surface; (b) applying a plurality of inorganic particles to the receiving surface; and (c) curing the combination of the preceramic composition and the ceramic particles to form at least a particulate layer and a matrix layer on the receiving surface.

A further embodiment of the foregoing method, wherein the method further comprises: prior to at least one of the applying steps, treating a surface of a substrate to form the receiving surface.

A further embodiment of any of the foregoing methods, wherein the treating step comprises: applying an electrostatic charge to the surface of the substrate.

A further embodiment of any of the foregoing methods, wherein the method further comprises iteratively performing steps (a)-(c) to form a plurality of alternating particulate layers and matrix layers arranged into a conformal layer-by-layer (LBL) coating, wherein: each particulate layer includes a plurality of ordered inorganic particles spaced and distributed substantially uniformly throughout the particulate layer, and a ceramic matrix material disposed between individual ones of the plurality of particles; and each matrix layer alternates with individual ones of the plurality of particulate layers, each matrix layer including primarily the ceramic matrix material.

A further embodiment of any of the foregoing methods, wherein the preceramic composition comprises a compound adapted to dissociate into a plurality of electrostatically charged ceramic precursors in a first solution.

A further embodiment of any of the foregoing methods, wherein the compound is a polymer which includes a plurality of functional groups adapted to dissociate from the polymer in the first solution.

A further embodiment of any of the foregoing methods, wherein the preceramic composition is selected from one or more of a group consisting of: polycarbosilane, polysiloxane, polysilazane, polycarbosiloxane, polysilane and polycarbosilazane.

A further embodiment of any of the foregoing methods, wherein the preceramic composition comprises a plurality of electrostatically charged ceramic particles in a second solution.

A further embodiment of any of the foregoing methods, wherein the first solution and the second solution are a common solution containing both the electrostatically charged ceramic precursors and the electrostatically charged inorganic particles.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An article comprising:
   an individual fiber substrate; and
   a conformal coating disposed over an outer surface of the individual fiber substrate, the conformal coating comprising:
      a first matrix layer including primarily a ceramic matrix material disposed on the outer surface of the individual fiber substrate;
      a second matrix layer including primarily the ceramic matrix material;
      a first particulate layer disposed between the first and second matrix layers, the first particulate layer including a plurality of ordered inorganic particles spaced and distributed substantially uniformly throughout the first particulate layer, and the ceramic matrix material disposed between individual ones of the first plurality of particles, thereby defining an individually reinforced fiber; and
      a second particulate layer disposed adjacent to the second matrix layer, the second particulate layer including a second plurality of ordered inorganic particles spaced and distributed substantially uniformly throughout the second particulate layer, and the ceramic matrix material disposed between individual ones of the second plurality of particles;

wherein less than 10% of the particles in the first particulate layer protrude into the second matrix layer.

2. The article of claim 1, wherein the individual fiber substrate is formed from one of a group consisting of: oxide ceramic fibers, carbide ceramic fibers, nitride ceramic fibers, boride ceramic fibers, phosphide ceramic fibers, glass-ceramic fibers, oxycarbide fibers, oxynitride fibers, metal fibers, glass fibers, and carbon fibers.

3. The article of claim 2, wherein the individual fiber substrate comprises silicon carbide (SiC).

4. The article of claim 1, wherein the first plurality of inorganic particles is selected from glass, carbides, oxides, nitrides, borides, phosphides, sulfides, and combinations thereof.

5. The article of claim 1, wherein the ceramic matrix material comprises silicon carbide (SiC).

6. A composite article comprising:
a bulk binder; and
a first plurality of individually coated fibers distributed throughout the bulk binder, the first plurality of individually coated fibers each comprising:
an individual fiber substrate; and
an individual conformal coating disposed over an outer surface of each individual fiber substrate, each conformal coating comprising:
a plurality of particulate layers, each layer including a plurality of ordered inorganic particles spaced and distributed substantially uniformly throughout each particulate layer, and a ceramic matrix material disposed between individual ones of the plurality of particles; and
a plurality of matrix layers including primarily the ceramic matrix material disposed between individual ones of the plurality of particulate layers.

7. The article of claim 6, wherein each individual fiber substrate is selected from one or more of a group consisting of: oxide ceramic fibers, carbide ceramic fibers, nitride ceramic fibers, boride ceramic fibers, phosphide ceramic fibers, glass-ceramic fibers, oxycarbide fibers, oxynitride fibers, metal fibers, glass fibers, and carbon fibers.

8. The article of claim 7, wherein each individual fiber substrate comprises silicon carbide (SiC).

9. The article of claim 6, wherein the plurality of ceramic particles comprises boron nitride (BN) and the ceramic matrix material comprises silicon carbide (SiC).

10. The article of claim 6, further comprising:
a second plurality of individual fibers intermingled in the binder with the first plurality of individual fibers, wherein the second plurality of individual fibers do not include the conformal coating.

11. A method comprising:
applying a preceramic composition to a receiving surface of each of a plurality of individual fiber substrates;
applying a plurality of inorganic particles to each receiving surface; and
curing the combination of the preceramic composition and the ceramic particles to form a conformal coating disposed over an outer surface of each of the individual fiber substrates, each conformal coating comprising:
at least a particulate layer and a matrix layer on the receiving surface of each of the plurality of individual fiber substrates;
an individual fiber substrate; and
a conformal coating disposed over an outer surface of the individual fiber substrate, the conformal coating comprising:
a first matrix layer including primarily a ceramic matrix material disposed on the outer surface of the individual fiber substrate;
a second matrix layer including primarily the ceramic matrix material; and
a first particulate layer disposed between the first and second matrix layers, the first particulate layer including a plurality of ordered inorganic particles spaced and distributed substantially uniformly throughout the first particulate layer, and the ceramic matrix material disposed between individual ones of the first plurality of particles, thereby defining an individually reinforced fiber; and
a second particulate layer disposed adjacent to the second matrix layer, the second particulate layer including a second plurality of ordered inorganic particles spaced and distributed substantially uniformly throughout the second particulate layer, and the ceramic matrix material disposed between individual ones of the second plurality of particles;
wherein less than 10% of the particles in the first particulate layer protrude into the second matrix layer.

12. The method of claim 11, further comprising:
prior to at least one of the applying steps, treating an outer surface of each of the plurality of individual fiber substrates to form each receiving surface.

13. The method of claim 12, wherein the treating step comprises:
applying an electrostatic charge to the surface of each of the plurality of individual fiber substrates.

14. The method of claim 11, further comprising:
iteratively performing the steps of claim 11 to form a plurality of alternating particulate layers and matrix layers arranged into a conformal layer-by-layer (LBL) coating, wherein:
each particulate layer includes a plurality of ordered inorganic particles spaced and distributed substantially uniformly throughout the particulate layer, and a ceramic matrix material disposed between individual ones of the plurality of particles; and
each matrix layer alternates with individual ones of the plurality of particulate layers, each matrix layer including primarily the ceramic matrix material.

15. The method of claim 11, wherein the preceramic composition comprises a compound adapted to dissociate into a plurality of electrostatically charged ceramic precursors in a first solution.

16. The method of claim 15, wherein the compound is a polymer which includes a plurality of functional groups adapted to dissociate from the polymer in the first solution.

17. The method of claim 16, wherein the preceramic composition is selected from one or more of a group consisting of: polycarbosilane, polysiloxane, polysilazane, polycarbosiloxane, polysilane and polycarbosilazane.

18. The method of claim 16, wherein the preceramic composition comprises a plurality of electrostatically charged ceramic particles in a second solution.

19. The method of claim 18, wherein the first solution and the second solution are a common solution containing both the electrostatically charged ceramic precursors and the electrostatically charged inorganic particles.

* * * * *